Patented July 14, 1953

2,645,748

UNITED STATES PATENT OFFICE 2,645,748

POTENTIOMETRIC MEASURING SYSTEM
AND APPARATUS

Albert Hansen, Jr., Lynn, Mass., assignor to General Electric Company, a corporation of New York Application June 21, 1951, Serial No. 232,854

11 Claims. (Cl. 318—28)

My invention relates to improvements in potentiometer measuring systems such as those used to convert a feeble measurement response into a powerful follow-up type of control, and its object is to accomplish such conversion with a high degree of accuracy, with a small time lag, and with relatively simple and highly reliable apparatus which is readily adapted to a wide variety of applications. A typical but by no means exclusive example of a suitable application of my invention is its use between a temperature measuring thermocouple and apparatus for indicating, recording, and controlling the temperature to which the thermocouple responds. An important, novel instrument which is made use of in my system is a saturable core type of standardized variable comparison reactance which operates without moving contacts and which can be used simultaneously to compare a direct current of reversible polarity with a standardized permanent magnet and control the value of its own reactance in accordance with the magnitude and direction of any variation in the value of the direct current from a given value including zero. By means of my invention the use of such things as moving contacts, standard cells, service batteries, slide wires, vibrator converters, delicately pivoted galvanometers, photoelectric cells and light sources commonly used in prior art conversion systems most nearly comparable to mine become unnecessary and the maintenance requirements and sources of error are, accordingly, reduced and the reliability and flexibility increased.

The features of my invention which are believed to be novel and patentable will be pointed out in the claims appended hereto. For a better understanding of my invention reference is made in the following description to the accompanying drawings in which In Figs. 1 and 2 use is made of a bridge circuit in which my magnetic standard variable reactance is used and which enables all alternating current components of the system to be supplied at the same frequency.

Figures 1, 1A:
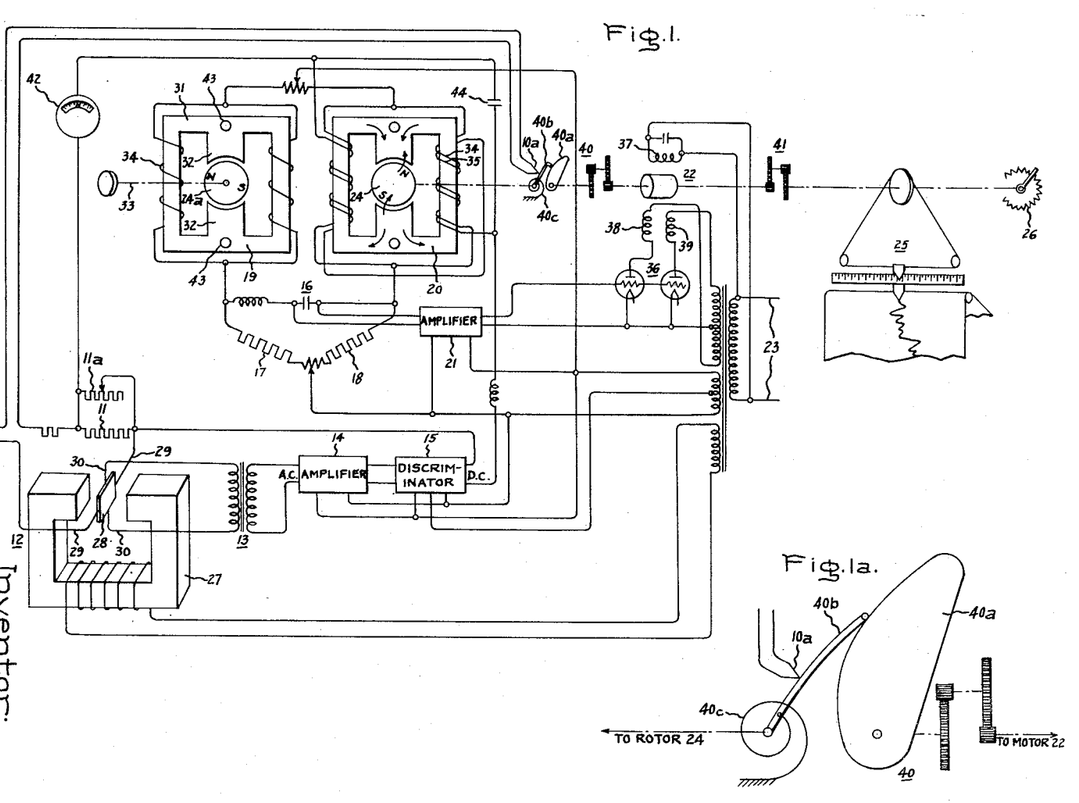
Fig. 1 illustrates my invention as applied to the measurement of temperature by means of a thermocouple and the indication recording and control of such temperature.
Fig. 1a represents a cold end thermocouple compensation detail of Fig. 1.

Referring now to Fig. 1, the principal components of the system include a primary detector or temperature measuring thermocouple 10, a feed-back resistor 11 in series with the thermocouple, and a Hall plate converter 12 for converting the direct current voltage of the thermocouple into an alternating current voltage. The converted voltage is fed through a transformer 13 and amplifier 14 to a discriminator 15, sometimes called a polarity sensitive rectifier, where the alternating current voltage is reconverted into direct current at a higher level than is obtainable from the thermocouple directly. At 16 is an alternating or intermittent current bridge circuit consisting of resistance arms 17 and 18 and reactance arms generally designated at 19 and 20. The direct current from the discriminator 15 flows through windings on the core of reactance arm 20, and a suitable portion of this direct current is also fed back through the feed-back resistor 11 in opposition to the thermocouple current therethrough.

The alternating current output of the bridge 16 is amplified as at 21 and employed to control the direction and extent of rotation of a servomotor 22 supplied from a 60-cycle source 23. The motor has a mechanical feed-back to a standardized permanet magnet rotor 24 comprising a part of the variable reactance arm 20 and when the motor 22 operates, the action is such as to rebalance the bridge and stop the motor. The rotor 24 and all other parts driven by the motor 22 thus take up a rotary position which is indicative of the magnitude of the current put out by the discriminator and, likewise, of the voltage output of the thermocouple 10 and of its temperature. The motor 22 may thus operate an indicating and recording device 25 calibrated directly in terms of the temperature of thermocouple 10, and operate a control initiator such as represented at 26 to control such temperature.

While a thermocouple has been shown at 10 as the primary detector, any other source of low value, direct current measurement current or voltage might be substituted and be caused to vary by some quantity to be measured.

The converter at 12 is of the type described in my United States Patent No. 2,464,807, March 22, 1949, assigned to the same assignee as the present invention. It involves no moving parts and is reliable in operation. Its magnet core 27 is energized from a constant voltage commercial source of alternating current which, for convenience, may be the same as that represented at 23 for the bridge 16 and servomotor 22. In the air gap of the core 27 there is a plate 28 of a material such as germanium which has good and consistent Hall effect properties. The field produced by the alternating current electromagnet 10 cuts the plate 28 at right angles. The direct current from thermocouple 10 is passed through the plate between input terminals 29 from edge to edge along one axis, and a voltage proportional to the field and input current appears across the edges of the plate along an axis at right angles to the input terminal axis. This output voltage is taken off at terminals 30 and fed to the primary of the step-up transformer 13. Since the field excitation is alternating and the input current direct, the output voltage will be alternating and of the same frequency as the field excitation. If the field excitation is kept constant, the output voltage will be proportional to the thermocouple input current, and hence, the thermocouple voltage is converted to an alternating current voltage which, as is well known, is easy to amplify with standard electronic tube apparatus. While only one stage of amplification is represented at 14, several stages may be used and the electronic tube discriminator 15 which converts the alternating current to direct current may include some amplification. The polarity of the direct current output of the discriminator 15 reverses with reversal in phase of the A. C. input voltage. Since such electronic tube apparatus is standard and well known, it will not be further described.

As here represented, the reactance arms 19 and 20 of the bridge 16 each employ a rectangular core of saturable magnetic material having two side branches connected by end yokes 31. Central pole pieces 32 extend inwardly from the end yokes to form air gaps in which there are centrally located rotatable permanent magnets 24 and 24a. The magnet 24a of reactance 19 is normally stationary but may be adjustably rotated by a friction held shaft 33 for initial adjustment purposes. On each side limb of the reactance core parts is an alternating current coil 34. These coils on each core are wound and connected so as to cause the alternating current flux produced by them in the core to circulate around the outside of the core, thus down in one side limb and up in the other side limb at any instant with no tendency to pass through the central air gap path. These alternating current coils of each reactance are shown connected in parallel. While a wide variety of shapes and arrangements of saturable alternating current reactance cores and coils may be had, the shape and arrangement shown has been found satisfactory for manufacturing purposes. Preferably, the cores, alternating current coils, and permanent magnets of the two reactances will be made similar except that rotor 24a is mounted for frictional, rotational adjustment, only, while rotor 24 is mounted for free rotation by motor 22.

The magnets 24 and 24a are well stabilized permanent magnets of circular two-pole design compensated for ambient temperature variations and in any given rotary position serve as magnetic standards and produce a fixed and constant value of unidirectional flux which does not change with temperature, use or age. It will be evident that if the rotors are turned so that their flux axes are horizontal and at right angles to the central pole pieces axis, they will have no effect upon the reactances of the bridge arms. However, if turned so that their magnetic poles are in alignment with the stator poles, their fluxes will pass through the alternating current winding branches, increasing the saturation in one branch on one half cycle and in the other branch on the opposite half cycle, and thereby reducing the alternating current reactance to a minimum. The alternating current excitation and dimensions of the cores are made such as to obtain substantial saturation by the alternating current when the permanent magnets are in a neutral position. Hence, a substantial and gradual reduction in reactance can be had by rotating the permanent magnets from a neutral position over a range of 90 degrees.

The reactance arm 20 has on its core a direct current winding in addition to the alternating current winding previously described and consists of similar coils 35 wound symmetrically on the outer limbs with the alternating current coils. The coils 35 are wound and connected in series in the direct current circuit output of the discriminator so that unidirectional fluxes produced thereby are opposed in the outer side limbs and hence are forced to cross the rotor gap space between the central pole pieces 32. Hence, flow of direct current in coils 35 will cause saturation and a reduction of the corresponding reactance arm 20 of the bridge in the same way that the permanent magnet rotor 24 may do so, depending upon its rotary position. In the normal operation of the system the flux produced by the direct current winding coils 35 between pole pieces 32 is opposed by the flux of rotor 24 in general as represented by the arrows on the core of reactance branch 20. Hence, the reactance of branch 20 is a function of the difference between these unidirectional fluxes which pass between pole pieces 32 and cause more or less saturation of the outer limbs. It is assumed that resistance arms 17 and 18 of the bridge are equal so that if the reactance arms 19 and 20 are similar, except as noted, the bridge will be balanced when the effective differential unidirectional circulating flux in the core of bridge arm 20 is equal to effective unidirectional circulating flux produced by permanent magnet rotor 24a in the core of bridge arm 19.

As indicated previously, reactance arm 19 of the bridge is a constant fixed reactance during normal operation of the system and could be replaced by an equivalent reactance that had no adjustable permanent magnet rotor 24a. However, it is a manufacturing and calibration convenience to make the reactance similar except as noted, but for the normal operation of the system the reactance branch 19 is fixed and it may also be assumed that its permanent magnet rotor 24a is in a neutral or approximately neutral position such that the reactance of the arms 19 and 20 is equal when no direct current flows in coils 35 of reactance 20 and its permanent magnet rotor 24 is in or approximately in a neutral position, and that the bridge is balanced. This will be the usual condition when the thermocouple 10 is producing no output voltage and the outputs of the converter 12 and discriminator 15 are zero.

Assume, now, that the temperature at the thermocouple starts to increase. This will cause a flow of current through the resistance 11 and the direct current input circuit of the converter 12 and a proportionate alternating current output from its output terminals. This voltage is stepped up by transformer 13, amplified at 14 and converted into a proportionate direct current output from discriminator 15. This discriminator output current is fed through the coils 35 of reactance branch 20 of the bridge and also in part through feed-back resistor 11 to oppose the voltage across such resistor produced by the thermocouple current. The amount of such feedback current which flows through the feed-back resistor 11 is adjusted to the proper amount as by a shunt resistor 11a so that it is non-predominating or only partially nullifies the thermocouple current therethrough under a steady-state condition. Hence, as the temperature increases, the discriminator output current increases and is kept exactly proportional to the thermocouple voltage to be measured by this feed-back comparing and regulating action. As will subsequently appear, the resistance 11a is also used for adjustment of the measurement range of the system.

It is now seen that a direct current flows in coils 35 of reactance bridge branch 20 which is proportional to the voltage to be measured. The first result of this is to reduce the reactance of such branch and unbalance the bridge, causing an alternating voltage of a given phase relation to appear across the output terminals of the bridge. This voltage is amplified as necessary at 21 and passed on to the grids of the thyratron tubes at 36 which serve as a reversing and input control switch for the motor 22.

This motor may be of the split-phase, reversible type as represented. One phase 37 is constantly energized from the alternating current power supply 23. The motor has displaced windings 38 and 39, respectively, energized through the pair of phase sensitive tubes at 36. When the bridge is unbalanced in one phase direction as by a predominance of the unidirectional flux produced by coils 35, one of the tubes at 36 passes current to energize, say, winding 38 to operate the motor 22 and rotate magnet 24 in a direction to nullify the flux from coils 35 and rebalance the bridge, thus stopping the motor. It will also be evident that the speed of motor 22 will be proportional to the extent of unbalance. As the temperature of thermocouple 10 increases, this rebalancing action is repeated, rotor 24 turning further in the direction to oppose the increasing unidirectional flux of coils 35. At the same time the motor drives the indicator and recorder at 25 upscale and operates the regulator indicated at 26 in the proper direction to effect the control desired. When rotor 24 has been thus rotated to align its flux axis with pole 32 to oppose the flux of coils 35, the load range limit for this adjustment is reached. However, by increasing the control sensitivity of the feed-back function of resistance 11 as by shunting less current through resistance 11a, the range for a given temperature change or change in measurement voltage may be increased. Thus, the resistance 11a may be used to adjust the measurement range of the system.

When the temperature of the thermocouple decreases, resulting in a decrease in the current in coils 35, the first result is the predomination of the flux of rotor magnet 24 and an unbalance of the bridge in the opposite direction from that initiated by a rise in temperature. Accordingly, the phase of this unbalance bridge output voltage is reversed, and the other tube of the pair at 36 passes current to energize the other winding 39 of motor 22 to cause the motor to operate in the reverse direction to that first assumed. Rotor magnet 24 is now turned to decrease its effective opposing flux until the bridge is again balanced. During such decreasing temperature operation of the system, the operations of the indicator, recorder and control initiator are, of course, reversed also. At 40 and 41, I have represented motion transmitting elements between the motor and the other parts operated thereby to indicate that the ratio of motion transmission may be made anything desired to suit the requirements, including the use of cams or variable ratio gearing to shape the scale distribution and the like.

In the case of temperature measurement by means of a thermocouple such as has been described, it may be desirable to compensate for variations in the temperature at the cold end junction point of the thermocouple circuit in case such temperature varies materially. Such compensation is indicated in Fig. 1 and in more detail in Fig. 1a. Included in the motion transmission apparatus between the motor 22 and the rotor 24 there are shown a cam 40a driven by the motor and a cam follower arm 40b which drives the rotor 24 through such cam, the cam follower being urged against the cam by a spring 40c or the like. The arm of the cam follower is made in part, at least, from temperature sensitive bimetal such that it will bend with changes in temperature in such a manner as to rotatively adjust the position of rotor 24 by a small amount, assuming that the cam 40a remains stationary. Also the direction and amount of such adjustment for a rise in ambient temperature are made such as to compensate for a corresponding variation in the cold end junction of the thermocouple circuit. Thus a rise in ambient or cold end junction temperature above normal would, if not compensated for, cause the system to read low and, hence, the direction of adjustment of rotor 24 to compensate for a rise in ambient temperature is that which reduces its effective flux, unbalances the bridge, and causes the motor 22 to advance the recorder and indicator 25 upscale by an amount to correct for the error and rebalance the bridge. In order that such compensation shall be exact, the cold end junction 10a of the thermocouple circuit is placed in thermal contact with the compensating arm 40b as represented.

Assume, now, that the voltage output of the thermocouple reverses by reason of an abnormally low temperature in its vicinity. This will reverse the phase of the alternating current output from the converter 12. The various electronic tube apparatus used in the amplifiers and discriminator are also supplied from the common alternating current source 23 as indicated, so that the polarity of the direct current output from the electronic discriminator may also be made phase sensitive and when the polarity of the measurement voltage reverses, the direction of direct current flow from the discriminator 15 reverses. The regulating actions previously described are the same except now the flux arrows shown in the core of reactance branch 20 will be reversed and rotor 24 will be turned from a neutral position, so that its N pole is below and its south pole above its center line; and when the reversed flux from coils 35 predominates, the phase direction of unbalance of the bridge will be reversed as compared to the bridge unbalance when the flux of coils 35 predominates but is in the direction previously assumed and indicated by the flux arrows. It is thus seen that the entire system operates correctly notwithstanding a reversal of polarity in the direct current measurement voltage and including a zero value of such measurement voltage.

It is common practice in earlier thermocouple temperature measurement and control systems to employ a standard cell as a standard reference voltage. A standard of reference is provided in my system by the well stabilized permanent magnet standard rotor 24 which has its flux for any given rotor position directly compared to the direct current or voltage which is being measured, since the direct current which flows in coils 35 is maintained strictly proportional to the direct current measurement voltage or current which in the example given is supplied by thermocouple 10.

It will be evident that where the measurement current is of sufficient magnitude to inject directly into coils 35 without amplification but insufficient to operate the end devices such as the recorder 25, I may dispense with the elements 11, 12, 13, 14 and 15. Also, in many cases where only an indication of the measurement current or voltage is desired, the bridge 16 and elements controlled thereby may be eliminated and the output current of the discriminator 15 measured directly as by a sensitive direct current instrument 42.

In order to give one practicable example of a set of specifications of a magnetic standard saturable core variable reactance such as is represented at 20, the core may be made of laminated silicon steel, the stack being about ¼ inch thick, and of the shape shown. I have also used a single lamination 0.025 inch thickness successfully. Since no power output is required of this device, it can be made quite small, but it should be large enough for mechanical construction purposes such as winding on the coils, etc. Cores having a horizontal width of two inches as pictured in Fig. 1, with other dimensions to correspond, are satisfactory. In order that the magnetic characteristics of the core shall remain stable in use, it is desirable that in fastening the laminations together and in supporting the core, it shall not be subject to strains or other conditions likely to result in changes in its permeability and other magnetic characteristics. In a laminated core it has been found practicable to rivet the laminations together by rivets at 43 and subsequently annealing. For 60-cycle alternating current supply and thermocouple measurement purposes, the alternating current winding coils 34 may each have about 900 turns for ten volts applied across the bridge, and the direct current winding coils 35 about 10,600 turns each for a direct current input current range from zero to five milliamperes. If the two reactance arms 19 and 20 are matched under bridge balance conditions, there is less likelihood of the bridge having any error due to variations in alternating current supply voltage. There is a tendency for a double frequency or second harmonic current to be reflected in the direct current coils 35 on the cores, and it is desirable to connect a condenser across this winding as shown at 44 to absorb this double frequency current. There is no problem in obtaining well stabilized permanent magnet rotors such as at 24. These rotors may have an axial length of three or four times the thickness of the lamination stack of the core.

Figure 2:
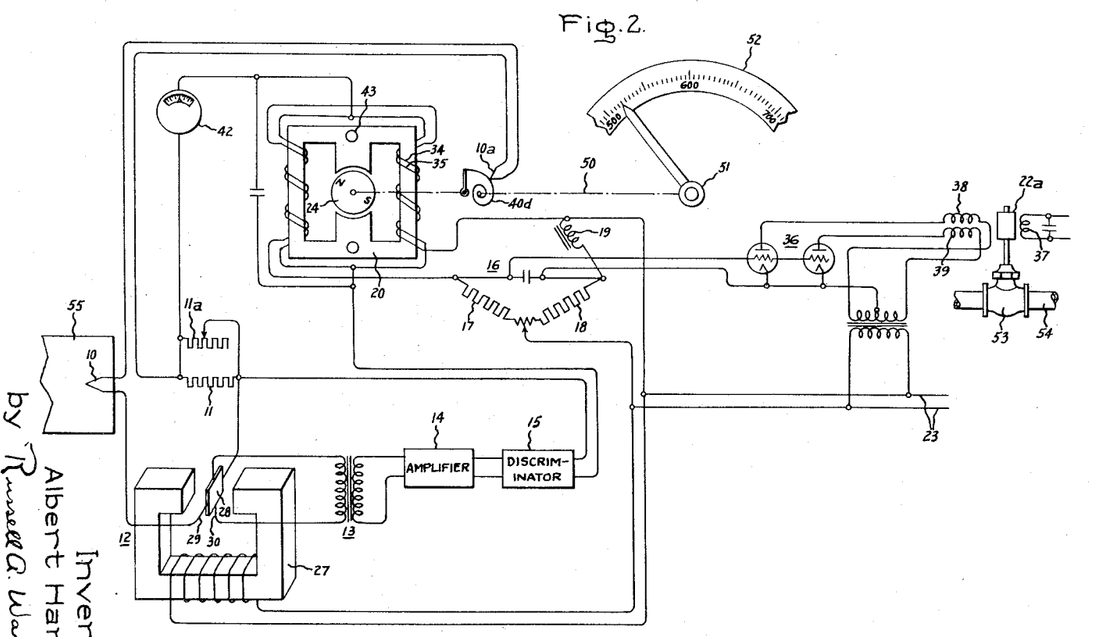
Fig. 2 illustrates the use of my invention for the measurement of temperature by means of a thermocouple and the control of such temperature to maintain it at a substantially fixed value.

In Fig. 2 there is illustrated an application of my measuring and control system for maintaining a substantially constant but adjustable condition such, for example, as temperature as measured by the thermocouple. The parts 10, 11, 12, 13, 14 and 15 correspond to the parts of like number already described in connection with Fig. 1. The bridge 16 may be like that of Fig. 1 except that the rotor 24 of the variable reactance arm 20 of the bridge is manually adjustable instead of being automatically adjustable by a servomotor, the adjusting device consisting of a shaft 50 and friction held knob 51 having a pointer indicating on a temperature calibrated scale 52. The output of the bridge 16 is shown as used to control a motor operated valve represented at 53 in a conduit 54 which supplies part or all of the fuel, such as gas, to heat a furnace indicated at 55. The thermocouple 10 is subject to the temperature of such furnace which is under the control of the measuring and control system.

The valve operating motor 22a and its control from the bridge output is or may be similar to that of the motor 22 of Fig. 1. In this arrangement the knob 51 is set to a position corresponding to the temperature which it is desired shall be held in the furnace 55. The position of rotor 24 corresponds to a certain definite current in coils 35 of the bridge reactance arm 20, and accordingly, to a certain definite temperature of thermocouple 10 for a bridge balanced condition. If the temperature is below this value, motor 22a will be opearted in a direction to open the valve 53 and supply more fuel to the furnace. When the temperature of the furnace increases beyond the value for which the rotor 24 is set, the bridge will unbalance in the opposite direction and motor 22a will be operated in the reverse direction to reduce the fuel supply to the furnace. To set the system to hold a higher furnace temperature, rotor 24 is turned to increase its opposing flux influence. This unbalances the bridge, motor 22a is operated in a valve opening direction, the furnace temperature increases, and the current flowing in coils 35 increases until the bridge is again balanced.

The cold end junction compensation, if used in Fig. 2, may comprise simply a bimetal arm or spiral 40d having its inner end fastened to the shaft 50 on which pointer 51 is mounted, and its outer end fastened to the shaft of rotor 24. The cold end junction 10a of the thermocouple system is placed in thermal contact with such temperature sensitive bimetal connection.

Figures 3, 3A:
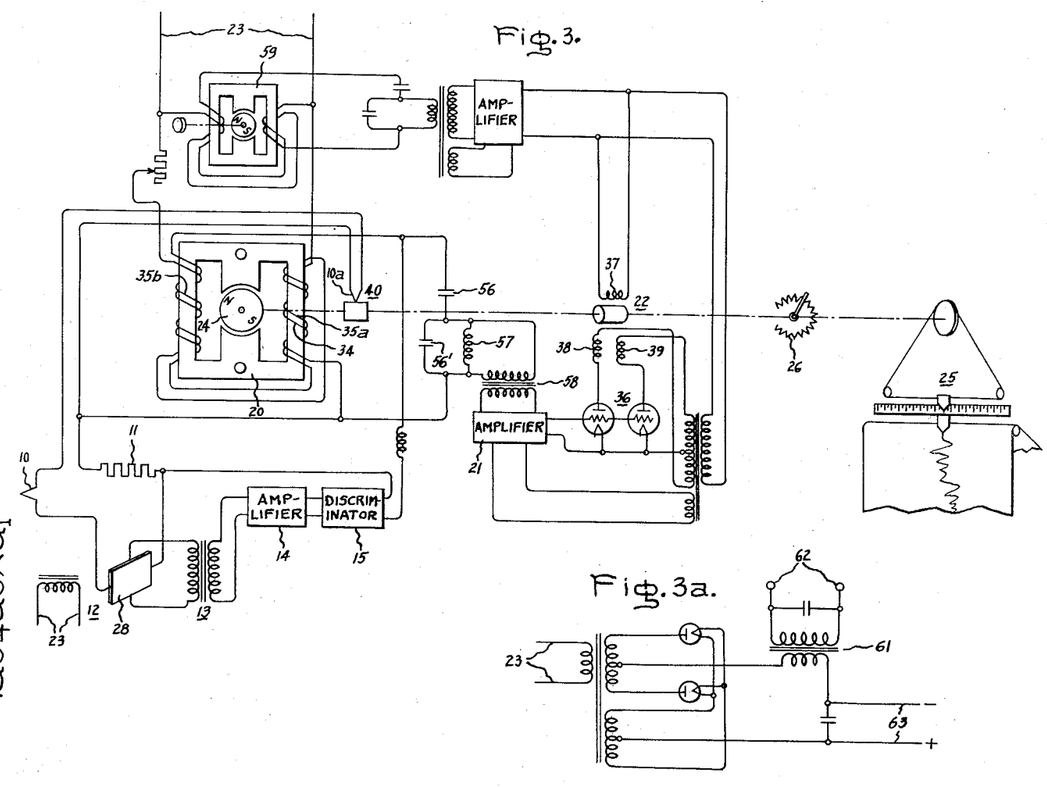
In Fig. 3 the bridge circuit is not used, and the magnetic standard variable reactance is employed in addition to its other functions as a source of double frequency control voltage.
Fig. 3a represents a way of obtaining a source of double frequency voltage for use as a reference voltage in Fig. 3.

It is known that in saturable core alternating current excited apparatus, currents may be induced in a secondary circuit which have a second harmonic component proportional to the extent of saturation. In Figs. 1 and 2 use is not made of such second harmonic currents and they are largely by-passed through a condenser 44. Fig. 3 shows an embodiment of my invention where instead of taking the control voltage off from a bridge, the second harmonic current induced in the direct current circuit of the saturable core standardizing reactor is employed for control purposes.

The thermocouple 10, converter 12, amplifier 14, and discriminator 15 circuit of Fig. 3 may be the same as that in Figs. 1 and 2. Likewise, the variable saturable core reactor 20 is the same as in Fig. 1. However, its primary winding 34 is excited directly from the 60-cycle alternating current source 23 and no bridge is used. Across the direct current winding 35 (here designated for convenience as comprising the coils 35a and 35b) is connected a circuit containing a condenser 56 in series with parallel connected condenser 56' and inductance 57 tuned so that any second harmonic voltage inducted in winding 35 will appear across the inductance 57. A reactance is preferably included in the direct current input circuit to prevent of second harmonic current components flowing therein.

Figure 4:
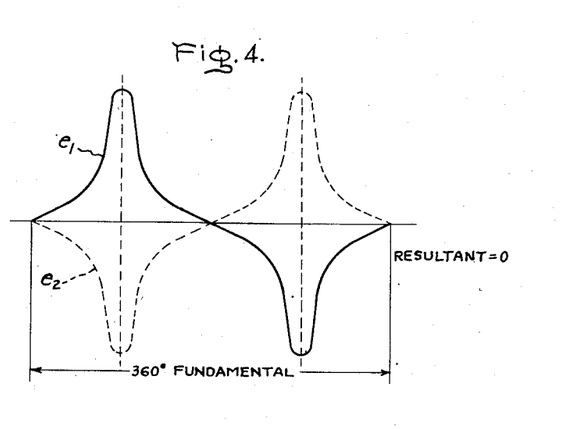
Figs. 4 and 5 are curves explanatory of the second harmonic control voltage obtained from the form of the invention shown in Fig. 3.

The alternating current input to the variable reactor 20 is adjusted so that with the rotor 24 in a neutral position and no direct current flowing in winding 35a—35b, the alternating current voltages induced in the two equal coils 35a and 35b may be represented about as shown in Fig. 4, where $e_1$ may represent the voltage induced in the coil 35a, and $e_2$ the voltage induced in coil 35b. These are 60-cycle nonsinusoidal waves indicating considerable saturation of the reactor by the alternating current fluxes.

However, since the coils 35a and 35b are connected in opposition as compared to the equal coil of the alternating current winding, the voltages $e_1$ and $e_2$ being exactly equal and opposite, cancel and there is no resultant alternating current voltage across the direct current winding under this condition; and if the voltages $e_1$ and $e_2$ were not exactly equal, the resultant would be a 60-cycle voltage to which the 120-cycle control apparatus used would not respond.

Figure 5:
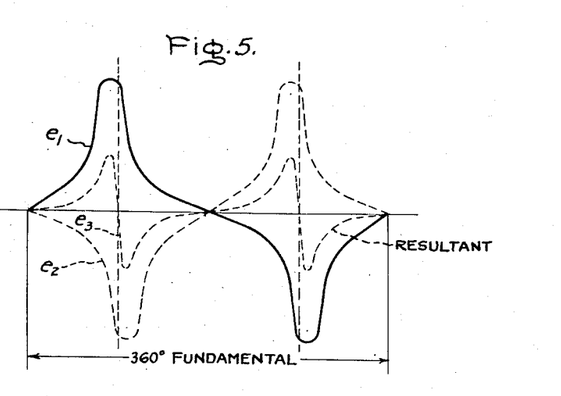

When a unidirectional flux is introduced in the reactor by either the direct current winding 35 or the rotor 24, the tops of the plus and minus voltage waves induced in the direct current coils are shifted relative to each as represented in curves $e_1$ and $e_2$, Fig. 5. Thus the tops of the positive half waves are shifted back, and the tops of the negative half waves are shifted forward, so that the positive and negative half waves no longer exactly cancel and there remains a resultant $e_3$ which is of double frequency referred to as the second harmonic, and which in Fig. 3 after transformation at 58 and amplification at 21 becomes the control voltage. The magnitude of this second harmonic control voltage is proportional to the differential unidirectional excitation produced by winding 35a—35b and the permanent magnet rotor 24, and the phase relation of such second harmonic voltage relative to the fundamental shifts with the direction of such differential unidirectional excitation. Thus, with reference to Fig. 5, if the unidirectional resultant flux through the core of reactor 20 be reversed, the first half wave of voltage $e_3$ there shown would be negative instead of positive. Now, in order to obtain phase sensitivity in this second harmonic control voltage apparatus, we need to have a reference second harmonic voltage related back to the fundamental 60-cycle source of supply 23. This may be done by supplying a second saturable core reactor 59 from source 23 for producing the reference second harmonic voltage the phase relation of which does not change relative to the fundamental. Thus, at 59, I have provided a saturable core reactor which may be generally similar to the one at 20 except that it should generally have a larger capacity and no direct current is circulated in its secondary winding, and its permanent magnet rotor, while initially adjustable to select the phase relation and magnitude of the reference voltage, is fixed during use.

The reference second harmonic voltage is then amplified, if necessary, and employed for power purposes for the regulating apparatus as needed. Thus, in Fig. 3, the servomotor 22 and its control are energized at 120 cycles, both the reference 120-cycle supply from reactor 59 and the 120-cycle control voltage derived through transformer 58 from reactor 20 being related back to the same 60-cycle supply source 23, and the 120-cycle energy received from reactor 59 having a fixed phase relation to such 60-cycle supply and the 120-cycle control voltage, if any, having a phase relation relative to the same 60-cycle source which is reversible and which is determined by the control requirements existing in the standardized saturable core variable reactor 20.

It will now be evident that the apparatus of Fig. 3 will perform the same functions as the apparatus of Fig. 1 to record, indicate and control, if desired, the temperature of thermocouple 10, or accurately and quickly to respond to the direction and magnitude of any other small direct current measurement voltage, and like the apparatus of Fig. 1 requires no standard cell, moving contacts, or slide wire control.

In Fig. 3a, I have represented another suitable way of obtaining a double frequency reference voltage such as is required in Fig. 3. The apparatus of Fig. 3a is essentially a full-wave electronic rectifier system with transformer means 61 in the direct current output circuit to pick up the double frequency ripple and convert it into an alternating current voltage at terminals 62 of twice the frequency of supply source 23, and having a fixed phase relation therebetween. The direct current rectifier output from terminals 63 will be useful for bias and cathode heating purposes in the electronic tube apparatus employed, and is to be preferred over the reference voltage supply apparatus shown in Fig. 3 on that account.

While there is illustrated and described particular embodiments of this invention, modifications thereof will occur to those skilled in the art. I desire it to be understood, therefore, that this invention is not to be limited to the particular arrangements disclosed, and I intend in the appended claims to cover all modifications which do not depart from the spirit and scope of this invention.

What I claim as new and desire to secure by Letters Patent of the United States is:

1. A system responsive to small variable direct currents termed the measurement current, a circuit containing a feed-back resistor in which the measurement current flows, converter means for converting such measurement current to alternating current, means for amplifying such alternating current, means for converting such alternating current to direct current at a higher level than the measurement current, connections for causing a portion of such higher level direct current to flow through said feed-back resistor in opposition to the measurement current therethrough, a saturable core reactor, a permanent magnet associated with and movable relative to said reactor for varying the degree of saturation thereof, a winding on said reactor supplied by said higher level direct current which also varies the degree of saturation of said reactor in proportion to the value of such current, said two reactor saturation varying means acting in opposition such that the saturable condition of the reactor varies in proportion to the differential saturation produced by said two saturation varying means, and electric control means responsive to the condition of saturation of said reactor.

2. A system responsive to small variable reversible direct current termed the measurement current, a circuit containing a feed-back resistor in which the current to be measured flows, converter means for converting such measurement current into alternating current, means for amplifying said alternating current and rectifying the same to produce a direct current proportional but of a greater magnitude than the measurement current and of a polarity that reverses with the polarity of the measurement current, connections for causing a portion of such greater magnitude current to flow through said feedback resistor in opposition to the flow of the measurement current therethrough, a saturable core reactor, a well stabilized permanent magnet associated with and adjustable with respect to said reactor for varying the condition of saturation thereof, a winding on said reactor supplied by said greater magnitude direct current for also varying the condition of saturation of said reactor in proportion to the magnitude of such current, said two reactor saturation varying means acting in opposition such that the condition of saturation of the reactor is a function of the differential saturation produced by said two saturation varying means, a control circuit connected with said reactor and into which a control voltage is introduced, the magnitude and direction of such control voltage being dependent upon the saturation condition of said reactor, and reversible control means controlled from said control circuit in response to the direction and magnitude of said control voltage.

3. A system for the measurement of small variable direct current comprising a circuit containing a feed-back resistor in which the measuring current flows, apparatus supplied by the measuring current and having no moving parts which produces a direct current proportional to the measuring current but of greater magnitude, connections for causing a portion of such greater magnitude current to flow through said feedback resistor in nonpredominating opposition to the measurement current therethrough, an alternating current control system, a saturable core variable reactor for supplying a control voltage to said system, a winding on said reactor in which said current of greater magnitude flows for varying the saturable condition of said reactor, a well stabilized permanent magnet movably associated with said reactor for also varying the saturable condition thereof, said two reactor saturation varying means acting in opposition, and reversible motor means controlled through said alternating current control system in accordance with the control voltage supplied thereto from said reactor for adjusting the position of said movable permanent magnet in a direction to reduce such control voltage.

4. A system for the measurement of small variable direct current comprising a circuit containing a feed-back resistor in which the measurement current flows, apparatus including a converter, an amplifier and a phase sensitive rectifier supplied by the measurement current for producing a direct current proportional to the measurement current but of greater magnitude, connections for causing a portion of such greater magnitude current to flow through said feed-back resistor in nonpredominating opposition to the measurement current therethrough, a phase sensitive alternating current control system, a saturable core variable reactor for supplying an alternating current control voltage to said control system which voltage varies in magnitude and in phase with variations in the saturable condition of said reactor, a winding on said reactor traversed by the direct current of greater magnitude for varying the condition of saturation of said reactor, a movable permanent magnet associated with the core of said reactor for varying the condition of saturation of said reactor in opposition to the variation produced by said winding, and reversible motor means controlled through said alternating current control system in accordance with the magnitude and phase of said control voltage for adjusting the position of said permanent magnet in a direction to reduce said control voltage.

5. A system responsive to temperature as measured by a thermocouple comprising a thermocouple measuring circuit including a feed-back resistor, stationary apparatus without moving contacts fed from such measurement circuit for producing a direct current proportional to the thermocouple current but of greater magnitude, connections for feeding a portion of the current of greater magnitude through the feed-back resistor in nonpredominating opposition to the thermocouple current therethrough, an alternating current control system, a saturable core variable reactor for producing an alternating current control voltage varying in magnitude and phase in said alternating current control system, said reactor having a winding thereon traversed by the direct current of greater magnitude for varying the condition of saturation of said reactor, a permanent magnet movably associated with the core of said reactor for varying the condition of saturation of said reactor in opposition to that produced by said winding, a mechanical feed-back including reversible motor means controlled through said control system in response to the direction and magnitude of the control voltage for varying the position of said magnet to reduce such control voltage, and temperature responsive means subject to the cold end junction temperature of said thermocouple measuring circuit for reducing the saturating action produced by said movable permanent magnet with increase in cold end junction temperature and vice versa.

6. A system as claimed in claim 5, in which the temperature responsive means is a bimetallic temperature responsive link in the mechanical feed-back between the reversible motor means and movable permanent magnet.

7. A system responsive to small variable direct current called the measurement current, comprising a circuit containing a feed-back resistor in which the measurement current flows, apparatus including a Hall plate converter fed by the measurement current, amplifier means fed from the converter and phase sensitive rectifier means fed from the amplifier means for producing a direct current proportional to the measurement current but at a higher level, connections for feeding a proportion of said higher level current through the feed-back resistor in nonpredominating opposition to the measurement current therethrough, an alternating current bridge including a saturable core variable reactor bridge arm, said reactor having a winding thereon traversed by said higher level direct current for varying the condition of saturation of said reactor and its reactance in said bridge in accordance with the current flowing in its winding, a permanent magnet movably associated with the core of said reactor also for varying the degree of saturation and reactance of said reactor and acting in opposition to the saturation effect produced by said winding, a control system subject to the voltage across said bridge, and reversible motor means operated through said control system in accordance with the direction and magnitude of said bridge control voltage for adjusting one of the previously mentioned reactance varying conditions in a direction to balance said bridge.

8. A system for the measurement of small direct current comprising a feed-back resistor in which the measurement current flows, apparatus including a Hall plate converter fed by the measurement current and electronic amplifier and rectifier means fed from the converter for producing a direct current proportional to but greater than the measurement current, connections for feeding a portion of said greater current through the feed-back resistor in non-predominating opposition to the measurement current therethrough, an alternating current bridge for producing a control voltage in accordance with its condition of unbalance and including two saturable core reactor arms, each of said reactors having a movable permanent magnet associated with its core for varying the condition of saturation and reactance of its reactor, one of said reactors having a winding thereon traversed by said greater direct current for varying the condition of saturation of such reactor and its reactance and acting in opposition to the permanent magnet of such reactor, a control system subject to the magnitude and phase direction of the voltage across said bridge, and reversible motor means controlled through said control system in accordance with the magnitude and phase direction of the bridge voltage for adjusting the permanent magnet of the reactor having said winding thereon in a direction to reduce the control voltage across the bridge to zero.

9. A system responsive to small variable direct current called the measurement current, comprising a feed-back resistor in which the measurement current flows, apparatus including a Hall plate converter fed by the measurement current and electronic amplifier and rectifier means fed from the converter for producing a direct current proportional to but greater than the measurement current, connections for feeding a portion of said greater current through the feed-back resistor in nonpredominating opposition to the measurement current therethrough, an alternating current control circuit, means including a saturable core variable reactor for supplying a control voltage to said control system, said control voltage varying in magnitude and phase with variations in reactance of said reactor, a winding on said reactor traversed by said greater direct current for varying the condition of saturation of said reactor and its reactance, a movable permanent magnet associated with the core of said reactor for varying the condition of saturation of said reactor and its reactance, said permanent magnet and winding acting in opposition, reversible motor means controlled through said control system in response to the magnitude and direction of such control voltage for adjusting a condition influencing the magnitude of said measurement current, in a direction to reduce the control voltage, and manual means for adjusting the position of said permanent magnet.

10. A system responsive to small variable direct current called the measurement current, comprising a circuit containing a feed-back resistor in which the measurement current flows, apparatus including a Hall plate converter fed by the measurement current and electronic amplifying and rectifying means fed from the converter for producing a direct current proportional but larger than the measurement current, connections for feeding back through said feed-back resistor a portion of said larger current in non-predominating opposition to the measurement current therethrough, a saturable core variable reactor, a permanent magnet movably associated with the core of said reactor for injecting a variabel amount of saturating flux therein, a direct current winding on the core of said reactor energized by said larger direct current for producing a saturating flux in such core proportional to such current and in opposition to the flux from said magnet, an alternating current winding on said reactor, a source of alternating current for energizing said alternating current winding at a fundamental frequency and causing a second harmonic voltage to be induced into said direct current winding on such core, the magnitude and phase relation of said second harmonic voltage being dependent upon the condition of saturation of said reactor, an alternating current control circuit connected to said direct current winding and energized from said second harmonic voltage, and means for deriving another second harmonic alternating current voltage from said fundamental frequency source of alternating current having a fixed phase relation to said fundamental frequency and used for reference purposes in said control circuit.

11. In a temperature controlled system, a thermocouple temperature measuring circuit, a saturable core reactor, a winding on said reactor traversed by a direct current proportional to the current in said thermocouple measuring circuit for varying the condition of saturation of said reactor, a permanent magnet associated with said reactor and adjustable relative thereto for also varying the condition of saturation of said reactor but in opposition to the saturation condition produced by said winding, and temperature responsive means in adjusting relation with said permanent magnet and subject to the cold end junction temperature of said thermocouple measuring circuit for reducing the reactor saturation produced by said permanent magnet as the cold end junction temperature increases and vice versa.

ALBERT HANSEN, JR.

References Cited in the file of this patent

UNITED STATES PATENTS

| Number | Name | Date |
|---|---|---|
| 2,053,154 | La Pierre | Sept. 1, 1936 |